May 24, 1938.　　　L. A. CARTER　　　2,118,489

LATHE

Filed Aug. 26, 1935　　　2 Sheets-Sheet 1

INVENTOR:
Lionel A. Carter,
by Canhan & Gravely,
HIS ATTORNEYS.

May 24, 1938.  L. A. CARTER  2,118,489
LATHE
Filed Aug. 26, 1935  2 Sheets-Sheet 2
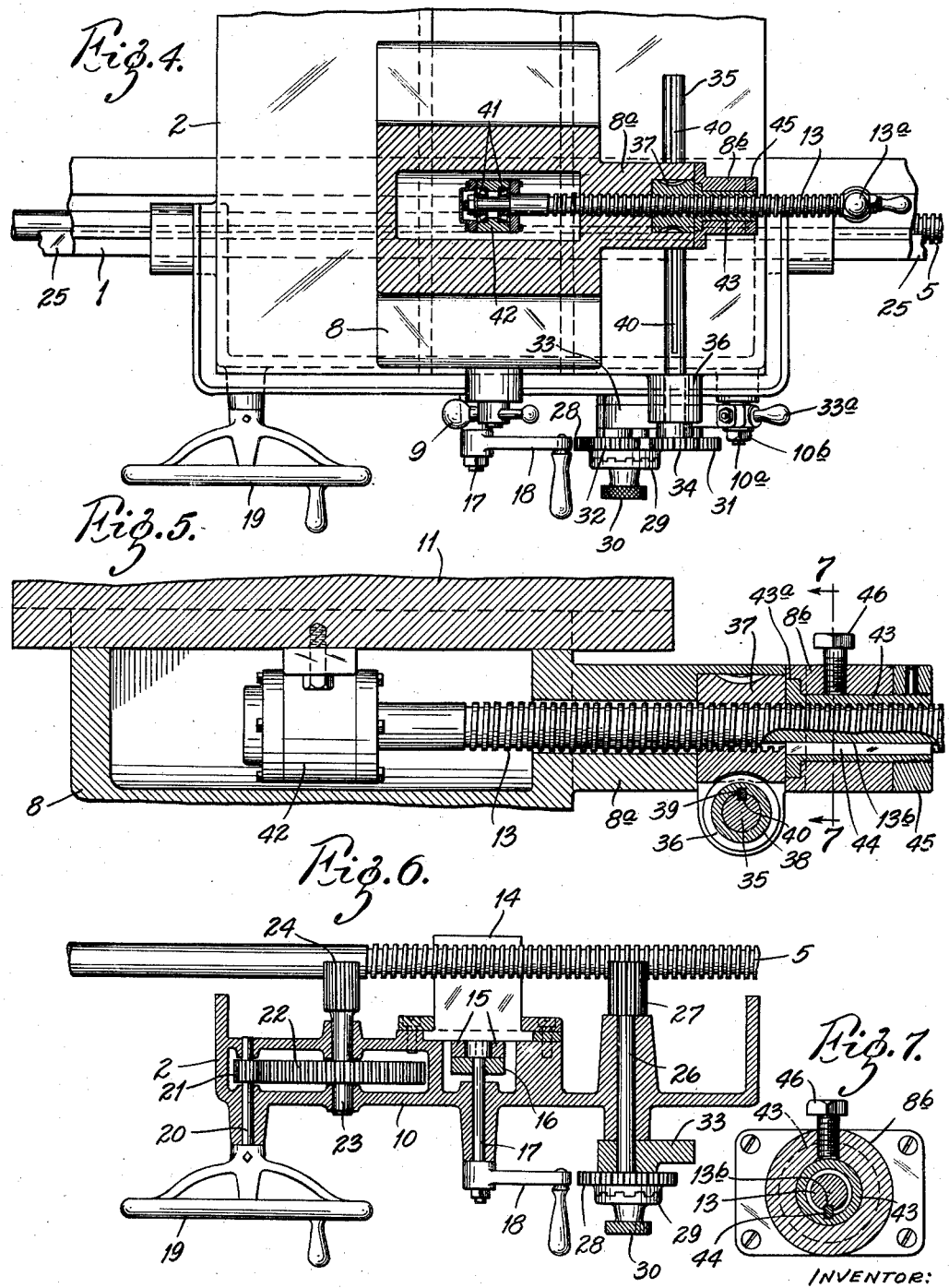

Patented May 24, 1938

2,118,489

UNITED STATES PATENT OFFICE 2,118,489

LATHE

Lionel A. Carter, Webster Groves, Mo.

Application August 26, 1935, Serial No. 37,812

13 Claims. (Cl. 82—5)

This invention relates to lathes of the type wherein the carriage feed employed for screw cutting includes a change speed mechanism for driving the feed screw at different selected speeds to cut screws of various leads. The invention has for its principal object to provide a plurality of additional lead changes for each lead change obtained by the change speed lead screw driving mechanism. Other objects are the simplicity and cheapness of construction and compactness of design. The invention consists in providing drive means for the auxiliary slide, whereby the tool may be moved at a faster or slower rate of travel than the carriage. The invention also consists in the construction and combinations and arrangements of parts hereinafter described and claimed.

In the accompanying drawings, which form part of this specification and wherein like symbols refer to like parts wherever they occur, Fig. 1 is a fragmentary front elevation of a screw cutting lathe embodying my invention;

Fig. 4 is a horizontal transverse section on the line 4—4 in Fig. 2;

Fig. 5 is a vertical longitudinal section on the line 5—5 in Fig. 3;

Fig. 6 is a horizontal section through the carriage apron on the line 6—6 in Fig. 2; and Fig. 7 is a vertical cross section on the line 7—7 in Fig. 5.

Figure 1:
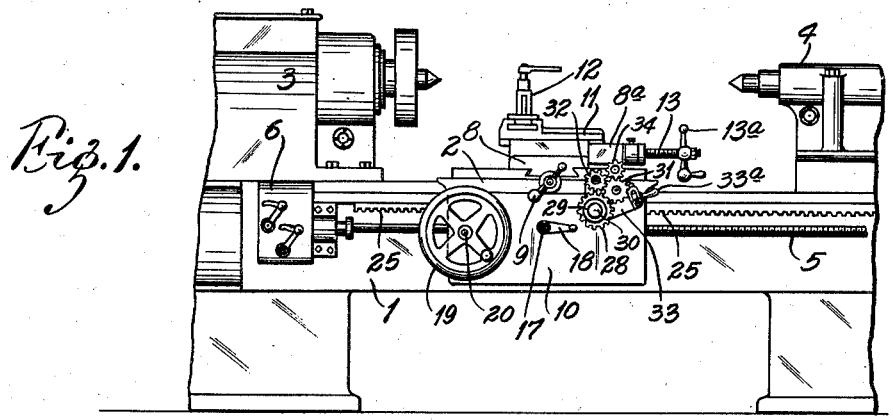
Figure 2:
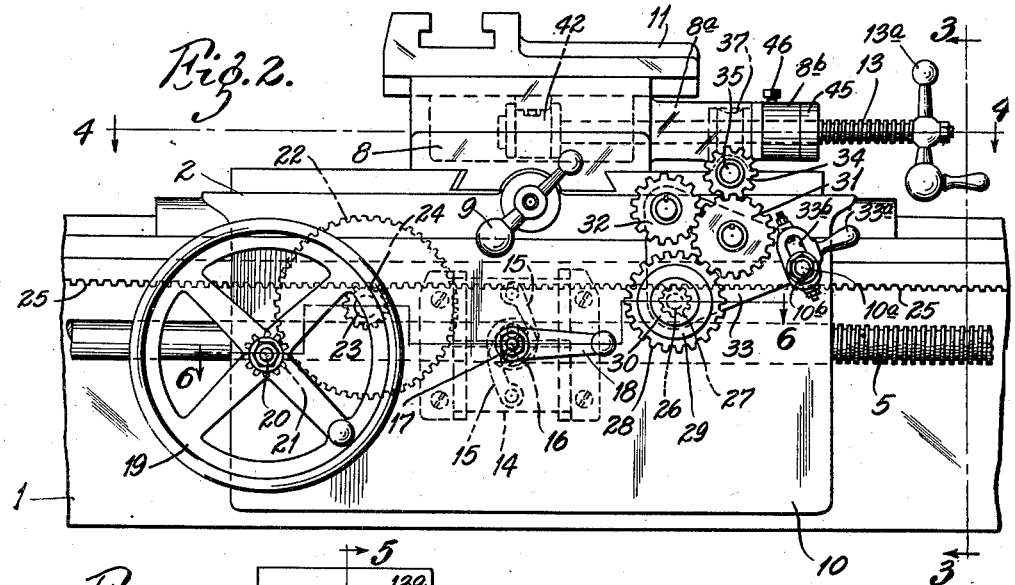
Fig. 2 is an enlarged fragmentary front elevation of the lathe carriage and the parts adjacent thereto.
Figure 3:
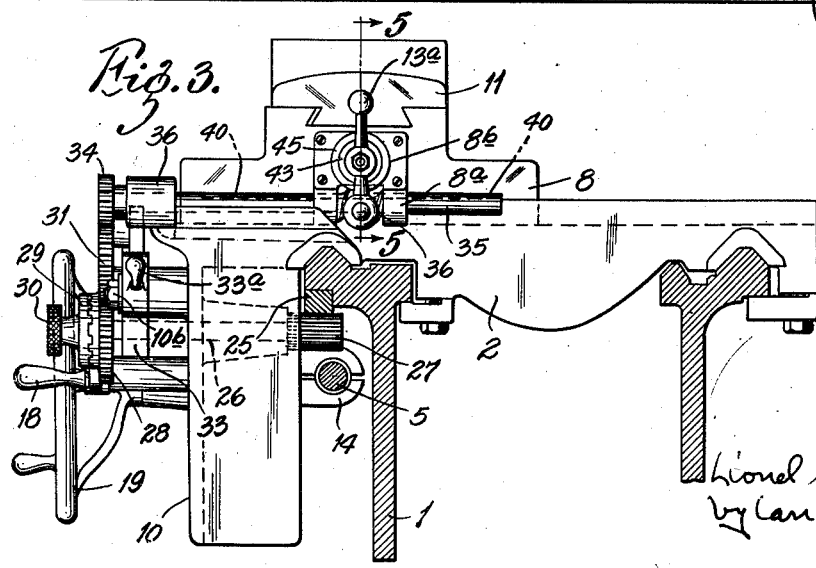
Fig. 3 is a vertical section on the line 3—3 in Fig. 2.

Referring to the accompanying drawings, my invention is shown embodied in the carriage of a screw-cutting lathe comprising a bed 1, a carriage 2 mounted on said bed for sliding movement longitudinally thereof between a headstock 3 and a tailstock 4, a lead screw 5 for sliding said carriage along said bed, and a housing 6 located beneath said head stock and contianing a suitable quick change mechanism (not shown) for driving said lead screw at different selected speeds. The carriage 2 has the usual cross slide 8 mounted thereon, whose operating mechanism includes an operating handle 9 located on the apron portion 10 of said carriage. The cross slide 8 has an auxiliary slide 11 mounted thereon for movement in the direction in which the carriage moves; and said auxiliary slide is provided with the usual post 12 for supporting a suitable thread-cutting tool. The auxiliary slide 11 is slid along the cross slide 8 by means of a feed screw 13 mounted in said auxiliary slide and provided at its outer end with an operating handle 13a.

The carriage 2 is connected to and disconnected from the lead screw 5 by a feed nut 14 comprising upper and lower half-nuts that are mounted to slide vertically in apron 10 of said carriage. The feed nut 14 is clamped on and released from the lead screw by a pair of curved links 15 that are connected at their adjacent ends to a rotary disk 16 and at their remote ends to the respective half-nuts or sections of said feed nut. The disk 16 is mounted on a rock shaft 17 journaled in the carriage apron 10 and provided outside of said apron with a suitable operating handle 18. The carriage 2 is manually actuated by means of a hand wheel 19 fixed to the outer end of a horizontal shaft 20 that is journaled in the apron 10 and has a pinion 21 fixed to its inner end that intermeshes with a gear 22 fixed to a shaft 23 that is journaled in said apron and is provided with a pinion 24 that cooperates with a rack 25 fixed to and disposed longitudinally of the lathe bed.

By the arrangement described, the quick change mechanism varies the rate of carriage feed, consequently the rate of tool feed to cut screws of various leads. In accordance with the present invention, the above lathe is provided with means for providing a plurality of additional lead changes for each speed change of the quick change mechanism. As shown in the drawings, this additional lead changing means comprises a horizontal shaft 26 journaled in the carriage apron 10 and provided at its inner end with a pinion 27, which cooperates with and is driven by the longitudinal rack 25 on the lathe bed 1, and at its outer end with a loose gear 28 adapted to be clutched to said shaft by means of a suitable clutch sleeve 29 provided at its outer end with a knurled operating knob 30. The gear 28 is in continuous mesh with a gear 31 which is in continuous mesh with a smaller gear 32. The gears 31 and 32 are mounted on shafts supported in a quadrant in the form of a triangular plate 33 that is rotatably mounted on the drive shaft 26, whereby the quadrant may be rotated on its pivotal axis to bring the gear 31 or the gear 32 into mesh with a gear 34 fixed to a horizontal shaft 35 journaled in a bearing 36 provided therefor on top of the carriage 2. The shaft 35 is disposed crosswise of the carriage and extends beneath and is operatively connected to the screw 13 for actuating the auxiliary slide 11. The gear supporting quadrant plate 33 is provided with a handle 33a for rotating said plate to bring either one of the two gears 31, 32 thereon into mesh with the gear 34 on the outer end of the feed screw operating shaft 35. Said plate is locked in either one of its positions of adjustment by means of a stud 10a that is fixed to the apron 10, extends through an arcuate slot 33b provided therefor in said plate and is provided at its outer end with a nut 10b adapted to bear against the outer face of said plate.

The feed screw 13 has a loose fit in an axial bore provided therefor in a lateral extension 8a of the cross slide 8 and is rotated from the gear-driven shaft 35 by means of a worm 36 that rotates with but is slidable axially of said shaft and cooperates with a worm gear 37, through which said screw is threaded. The worm gear 37 is mounted in a downwardly opening recess provided therefor in the lateral extension 8a of the cross slide 8; and the worm 36 is formed on a sleeve 38 that has a key 39 fitting a spline 40 provided therefor in the shaft 35, whereby said shaft is movable with the cross slide 8 axially of the worm without disturbing the driving connection therebetween. The inner end of the feed screw 12 is mounted for rotary, but non-axial movement, in taper roller bearings 41 enclosed within a housing 42 that is fixed to the underside of the auxiliary slide 11. The feed screw is splined, as at 13b, and a sleeve 43 has a feather key 44 fitting within said spline. The sleeve 43 is mounted in the outer end portion of the lateral extension 8a of the cross slide in abutting relation to the outer end face of the worm gear 37, which portion is made in the form of a removable section 8b of said extension; and said sleeve is held against axial movement in said extension by a flange 43a on the inner end thereof and a ring nut 45 threaded on the outer end thereof in abutting relation to said extension. A set screw 46 is threaded into the section 8b of the cross slide extension 8a in abutting relation to the sleeve 43. When the set screw is released, manual adjustment of the slide 11 may be afforded by turning the handle 13a on the feed screw 13. When said set screw is tightened against the sleeve 43, said sleeve is held against rotation and the slide 11 is actuated by travel of the worm nut 37 along said screw.

By the arrangement described, the lead obtained by any one of the speed changes available through the quick change mechanism may be slightly increased or decreased by means of the driving connection between the carriage 2 and the auxiliary slide feed screw 11. When the carriage moves along the bed, with the clutch 29 engaged and the set screw 46 tightened against the sleeve 43 splined and threaded on the auxiliary slide feed screw 11, the pinion 27 is rotated by the rack 25, thereby actuating the driving connection between said pinion and the worm nut 37 on the auxiliary slide feed screw 11 and thus causing said nut to travel along said screw and move the auxiliary slide and the tool thereon at a faster or slower rate of travel than the carriage. When the drive is transmitted from the gear 28 to the gear 34 directly through the gear 31, the travel of the tool-supporting slide 11 is faster than the travel of the carriage, thereby making the lead of the screw greater than that which would be produced if the tool were moving at the same speed as the carriage. When the drive is transmitted from the gear 28 to the gear 34 through the gear 31 and the change-speed gear 32, the travel of the tool-supporting slide is slower than the carriage, thereby producing a screw of less lead than that which would be produced if the tool were moving at the same rate of speed as the carriage.

Obviously, the hereinbefore described construction admits of a considerable amount of modification without departing from the invention. Therefore, I do not wish to be limited to the precise construction shown and described.

What I claim is:

1. The combination of a bed, a carriage slidable on said bed, a lead screw feed mechanism for said carriage, feed mechanism for said carriage including a rack on said bed, a member sustained by and movable relative to said carriage in the direction of the carriage feed, and means for feeding said member at a faster or slower rate of travel than said carriage, said means including a pinion journaled on said carriage for movement therewith and meshing with and driven by said rack.

2. The combination of a bed, a carriage slidable on said bed, feed mechanism for moving said carriage at a definite rate of feed, a member sustained by and movable relative to said carriage in the direction of the carriage feed, and toothed gearing mounted on and operated by the sliding movement of said carriage for feeding said member at a faster or slower rate of travel than said carriage, whereby the rate of carriage feed is modified by the different rates of feed of said member.

3. The combination of a bed, a carriage slidable on said bed, feed mechanism for moving said carriage at a definite rate of feed including means for changing the rate of carriage feed, a member sustained by and movable relative to said carriage in the direction of the carriage feed, and toothed gearing mounted on and actuated by the movement of said carriage for causing relative movement of said carriage and said member, whereby the rate of carriage feed is modified by the different rates of feed of said member.

4. The combination of a bed, a carriage slidable on said bed, a change-speed feed mechanism for moving said carriage at a definite rate of feed, a tool supporting member sustained by and movable relative to said carriage in the direction of the carriage feed, and a change-speed toothed drive gear connection between said carriage and said member operated by the movement of said carriage for feeding said member at a different rate of travel from said carriage, whereby the rate of carriage feed is modified by the different rates of feed of said member.

5. The combination of a bed, a carriage slidable on said bed, a feed mechanism for said carriage, a member sustained by and movable relative to said carriage in the direction of the carriage feed, and a driving connection between said carriage and said member operated by the movement of said carriage for feeding said member at a different rate of travel from said carriage, said driving connection including toothed change speed gearing for changing the rate of travel of said member, and means for rendering said driving toothed gearing inoperative by the movement of said carriage.

6. A lathe comprising a bed, a carriage slidable thereon, change speed feed mechanism for said carriage, a cross slide mounted on said carriage, an auxiliary slide mounted on said cross slide for movement in the direction of the carriage feed, a feed screw for said auxiliary slide, and a driving connection between said carriage and said feed screw including a wheel journaled on said carriage and driven by the movement of said carriage for moving said auxiliary slide at a different rate of feed from said carriage feed.

7. A lathe comprising a bed, a carriage slidable thereon, feed mechanism for said carriage, a cross slide mounted on said carriage, an auxiliary slide mounted on said cross slide for movement in the direction of the carriage feed, a feed screw operatively connected to said auxiliary slide, and a driving connection between said carriage and said feed screw including a nut threaded on said feed screw and mounted in said cross slide against axial movement, a worm gear on said nut, a shaft journaled on said cross slide parallel to the direction of movement thereon, a sleeve slidably splined on said shaft and having a worm thereon intermeshing with said worm gear, and means operated by the movement of said carriage for driving said shaft.

8. A lathe comprising a bed, a carriage slidable thereon, change speed feed mechanism for said carriage, a cross slide mounted on said carriage, an auxiliary slide mounted on said cross slide for movement in the direction of the carriage feed, a feed screw operatively connected to said auxiliary slide, and a driving connection between said carriage and said feed screw including a nut threaded on said feed screw and mounted in said cross slide against axial movement, a worm gear on said nut, a shaft journaled on said cross slide parallel to the direction of movement thereon, a sleeve slidably splined on said shaft and having a worm thereon intermeshing with said worm gear, and change speed gearing operated by the movement of said carriage for driving said shaft.

9. A lathe comprising a bed having a longitudinal rack, a carriage slidable thereon, change speed feed mechanism for said carriage, a cross slide mounted on said carriage, an auxiliary slide mounted on said cross slide for movement in the direction of the carriage feed, a feed screw for operating said auxiliary slide, and a driving connection between said carriage and said feed screw including a nut threaded on said feed screw and mounted in said cross slide against axial movement, a worm gear on said nut, a shaft journaled on said cross slide parallel to the direction of movement thereon, a sleeve slidably splined on said shaft having a worm thereon intermeshing with said worm gear, and change speed mechanism operated by the movement of said carriage for driving said worm shaft, said mechanism comprising a drive shaft journaled on said carriage, a pin on said drive shaft cooperating with said rack, a gear on said drive shaft, a gear on said worm shaft, a plate mounted on said carriage for pivotal movement about the drive shaft axis, a gear journaled on said plate in continuous mesh with the gear on said drive shaft, and a gear journaled on said plate in continuous mesh with said last mentioned gear, the two last mentioned gears being adapted to be selectively meshed with the worm shaft gear by rocking the pivoted supporting plate for said two gears.

10. In a machine tool, the combination of a bed, a carriage slidable on said bed, a power driven feed screw for moving said carriage along said bed at a definite rate of travel, a member slidably sustained by said carriage, and means operated by the travel of said carriage along said bed for moving said member relative to said carriage in the direction of but at a different rate of travel from the carriage travel, whereby the definite rate of carriage travel is modified by the different rate of travel of said member, said means including a wheel journaled on said carriage in rolling contact with a stationary reaction portion provided therefor on said bed.

11. In a machine tool, the combination of a bed, a rack on said bed, a carriage slidable on said bed, a power driven feed screw for moving said carriage along said bed at a definite rate of travel, a member slidably sustained by said carriage, and means operated by the travel of said carriage along said bed for moving said member relative to said carriage in the direction of but at a different rate of travel from the carriage travel, whereby the definite rate of carriage travel is modified by the different rate of travel of said member, said means including a pinion rotatably supported on and movable with said carriage and meshing with and driven by said rack.

12. In a machine tool, the combination of a bed, a carriage slidable on said bed, a power driven feed screw for moving said carriage along said bed at a definite rate of travel, a member slidably sustained by said carriage, and means operated by the travel of said carriage along said bed for moving said member relative to said carriage in the direction of but at a different rate of travel from the carriage travel, whereby the definite rate of carriage travel is modified by the different rate of travel of said member, said means including a wheel journaled on and movable with said carriage and in rolling contact with a stationary surface.

13. In a machine tool, the combination of a bed, a carriage slidable on said bed, a power driven feed screw for moving said carriage along said bed at a definite rate of travel, a member slidably sustained by said carriage, and means operated by the travel of said carriage along said bed for moving said member relative to said carriage in the direction of but at a different rate of travel from the carriage travel, whereby the definite rate of carriage travel is modified by the different rate of travel of said member.

LIONEL A. CARTER.